(12) United States Patent
Waite et al.

(10) Patent No.: US 9,988,912 B2
(45) Date of Patent: Jun. 5, 2018

(54) THERMAL REGULATION CHANNELS FOR TURBOMACHINE COMPONENTS

(71) Applicant: UNITED TECHNOLOGIES CORPORATION, Farmington, CT (US)

(72) Inventors: Ryan A. Waite, South Windsor, CT (US); Benjamin F. Hagan, Manchester, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 473 days.

(21) Appl. No.: 14/707,988

(22) Filed: May 8, 2015

(65) Prior Publication Data

US 2016/0326887 A1  Nov. 10, 2016

(51) Int. Cl.
*F01D 5/18* (2006.01)
*F01D 25/12* (2006.01)
*F02C 7/18* (2006.01)

(52) U.S. Cl.
CPC ............. *F01D 5/187* (2013.01); *F01D 25/12* (2013.01); *F02C 7/18* (2013.01); *F05D 2220/32* (2013.01); *F05D 2230/50* (2013.01); *F05D 2240/12* (2013.01); *F05D 2260/202* (2013.01); *F05D 2260/232* (2013.01); *Y02T 50/673* (2013.01); *Y02T 50/676* (2013.01)

(58) Field of Classification Search
CPC ............ F01D 25/12; F01D 5/187; F02C 7/18
USPC ........................................................ 416/97 R
See application file for complete search history.

(56) References Cited

U.S. PATENT DOCUMENTS

| 3,111,302 | A | * | 11/1963 | Bowmer ................... F01D 5/18 416/90 R |
| 4,293,275 | A | * | 10/1981 | Kobayashi .............. F01D 5/187 416/96 R |
| 4,767,268 | A | | 8/1988 | Auxier et al. |
| 5,120,192 | A | * | 6/1992 | Ohtomo ................. F01D 5/189 415/115 |
| 5,203,873 | A | | 4/1993 | Corsmeier et al. |
| 5,704,763 | A | | 1/1998 | Lee |
| 6,206,638 | B1 | | 3/2001 | Glynn et al. |
| 6,547,525 | B2 | * | 4/2003 | Haehnle ................... B22C 9/10 415/115 |

(Continued)

FOREIGN PATENT DOCUMENTS

EP    1201879 A2    5/2002

OTHER PUBLICATIONS

English Translation to Abstract to EP1201879.
European Search Report Application No. EP 16 15 9166.

*Primary Examiner* — Woody Lee, Jr.
(74) *Attorney, Agent, or Firm* — Cantor Colburn LLP

(57) ABSTRACT

A turbomachine component (e.g., a blade, vane, or any other suitable component) is defined at least partially in a radial direction and an axial direction orthogonal to the radial direction and includes a body defining an outer surface configured to be in thermal communication with a gas path flow in the axial direction. The component includes a thermal regulation channel system defined within the body which includes at least one radial channel configured to allow thermal regulation flow in the radial direction, and at least one axial channel configured to allow thermal regulation flow in the axial direction.

16 Claims, 2 Drawing Sheets

(56) References Cited

U.S. PATENT DOCUMENTS

| | | | |
|---|---|---|---|
| 7,866,948 B1 * | 1/2011 | Liang | F01D 5/186 |
| | | | 416/97 R |
| 9,051,841 B2 * | 6/2015 | Janke | F01D 5/187 |
| 2015/0345303 A1 * | 12/2015 | Dong | F01D 5/186 |
| | | | 60/806 |

* cited by examiner

THERMAL REGULATION CHANNELS FOR TURBOMACHINE COMPONENTS

STATEMENT OF GOVERNMENT RIGHTS

This invention was made with government support under contract no. FA-8650-09-D-2923-0021 awarded by the Air Force. The government has certain rights in the invention.

BACKGROUND

1. Field

The present disclosure relates to thermal regulation channels, more specifically to thermal regulation channels in turbomachine components.

2. Description of Related Art

Hardware that operates in extremely hot environments is very challenging to keep cool. One method for providing the necessary cooling effects has been to utilize thin cooling passages on the backside of the hot surface. The thin cooling passages provide coolant that transfers the heat away from the hot surface that is in thermal communication with a gas path. Traditional methods utilize thin passages that direct cooling flow normal to the direction of the gas path flow (e.g., the cooling flow travels in the radial direction in a turbomachine and hot gas path flow is axial). Also, location of cooling flow exit holes are related to the location of the passages disposed within the device, which can reduce efficiency from an aerodynamic perspective.

Such conventional methods and systems have generally been considered satisfactory for their intended purpose. However, there is still a need in the art for improved thermal regulation channels. The present disclosure provides a solution for this need.

SUMMARY

In accordance with at least one aspect of this disclosure, a turbomachine component (e.g., a blade, vane, or any other suitable component) is defined at least partially in a radial direction and an axial direction orthogonal to the radial direction and includes a body defining an outer surface configured to be in thermal communication with a gas path flow in the axial direction. The component includes a thermal regulation channel system defined within the body which includes at least one radial channel configured to allow thermal regulation flow in the radial direction, and at least one axial channel configured to allow thermal regulation flow in the axial direction. The body can include an airfoil shape or any other suitable shape.

At least one film hole can be defined through a wall of the body and into the thermal regulation channel system to induce axial flow in the at least one axial flow channel. The flow from the thermal regulation channel system can effuse into the gas path flow.

The at least one radial channel can include a larger flow area than the at least one axial channel. In certain embodiments, the at least one radial channel can include two radial channels.

The at least one axial channel can include a plurality of axial channels connecting the two radial channels. The at least one film hole can include at least one film hole per axial channel. Each film hole can define a channel system opening positioned axially and/or radially aligned with one or more respective axial channels to induce an axial flow through the axial channel.

In certain embodiments, the plurality of axial channels can include at least one pair of axial channels that are radially and/or axially aligned on opposite circumferential sides of the two radial channels. In certain embodiments, there can be at least one film hole per pair of axial channels to induce an axial flow through the axial channels as described above. Each film hole can be angled in a direction of gas path flow from the channel system opening to a gas path opening.

In accordance with at least one aspect of this disclosure, a component includes a body defining an outer surface configured to be in thermal communication with a gas path flow in an axial direction and a thermal regulation channel system as described above.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
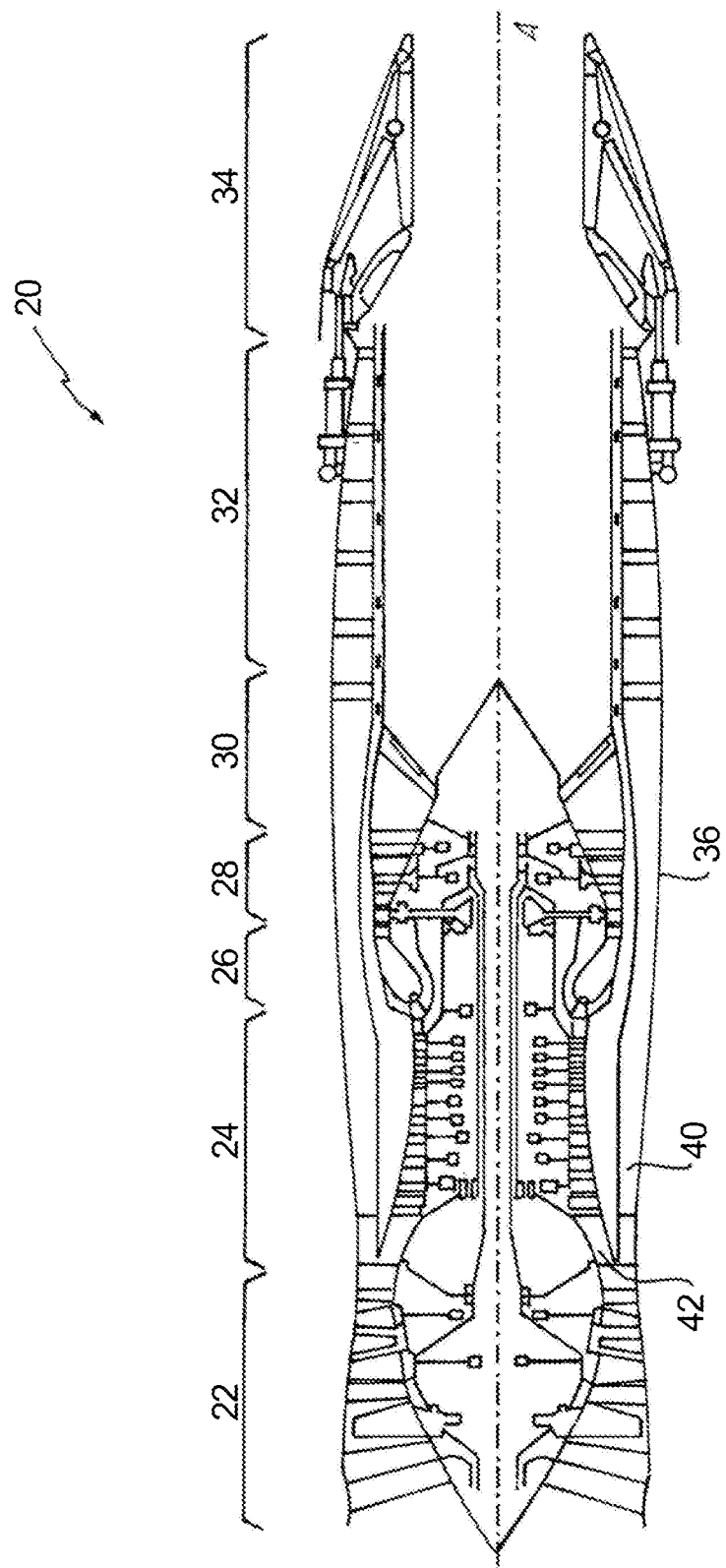
FIG. 1 is a schematic view of a turbomachine in accordance with this disclosure.
Figure 2:
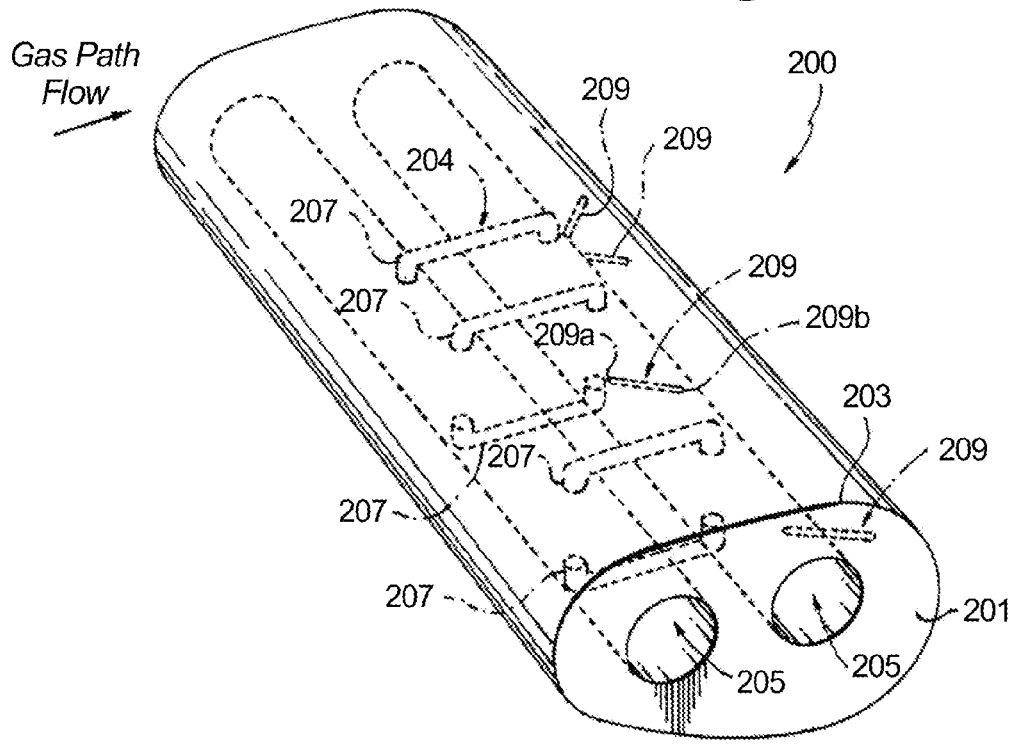
FIG. 2 is a perspective schematic view of an embodiment of a turbomachine component in accordance with this disclosure, showing flow volumes therein in phantom.
Figure 3:
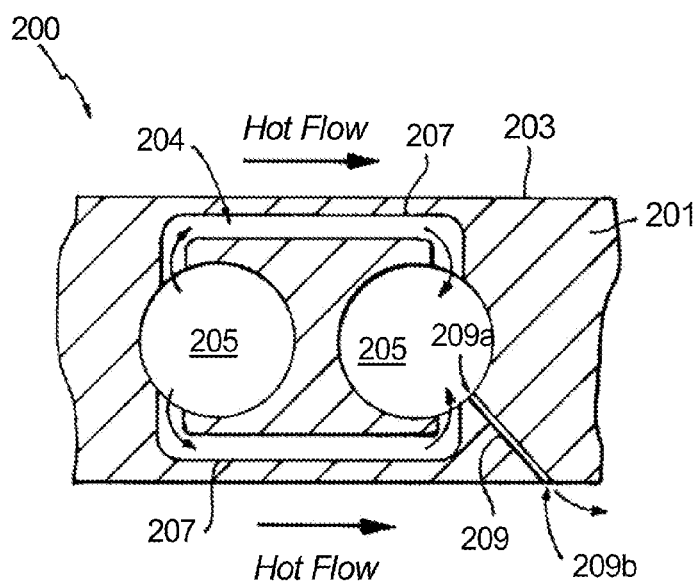
FIG. 3 is a cross-sectional view of the component of FIG. 2, showing thermal regulation flow therein.

Reference will now be made to the drawings wherein like reference numerals identify similar structural features or aspects of the subject disclosure. For purposes of explanation and illustration, and not limitation, an illustrative view of an embodiment of a turbomachine component in accordance with the disclosure is shown in FIG. 2 and is designated generally by reference character 200. Other embodiments and/or aspects of this disclosure are shown in FIGS. 1 and 3. The systems and methods described herein can be used to thermally regulate (e.g., cool) the surface of turbomachine components.

FIG. 1 schematically illustrates a gas turbine engine 20. The gas turbine engine 20 is disclosed herein as a two-spool low-bypass augmented turbofan that generally incorporates a fan section 22, a compressor section 24, a combustor section 26, a turbine section 28, an augmenter section 30, an exhaust duct section 32, and a nozzle system 34 along a central longitudinal engine axis A. Although depicted as an augmented low bypass turbofan in the disclosed non-limiting embodiment, it should be understood that the concepts described herein are applicable to other gas turbine engines including non-augmented engines, geared architecture engines, direct drive turbofans, turbojet, turboshaft, multi-stream variable cycle adaptive engines and other engine architectures. Variable cycle gas turbine engines power aircraft over a range of operating conditions and essentially alters a bypass ratio during flight to achieve countervailing objectives such as high specific thrust for high-energy maneuvers yet optimizes fuel efficiency for cruise and loiter operational modes.

An engine case structure 36 defines a generally annular secondary airflow path 40 around a core airflow path 42. It should be appreciated that various components, individually and collectively, may define the engine case structure 36 that essentially defines an exoskeleton to support the rotational hardware.

Air that enters the fan section 22 is divided between a core airflow through the core airflow path 42 and a secondary airflow through a secondary airflow path 40. The core airflow passes through the combustor section 26, the turbine section 28, then the augmentor section 30 where fuel may be selectively injected and burned to generate additional thrust through the nozzle system 34. It should be appreciated that additional airflow streams such as third stream airflow typical of variable cycle engine architectures may additionally be sourced from the fan section 22.

The secondary airflow may be utilized for a multiple of purposes to include, for example, cooling and pressurization. The secondary airflow as defined herein may be any airflow different from the core airflow. The secondary airflow may ultimately be at least partially injected into the core airflow path 42 adjacent to the exhaust duct section 32 and the nozzle system 34.

The exhaust duct section 32 may be circular in cross-section as typical of an axisymmetric augmented low bypass turbofan or may be non-axisymmetric in cross-section to include, but not be limited to, a serpentine shape to block direct view to the turbine section 28. In addition to the various cross-sections and the various longitudinal shapes, the exhaust duct section 32 may terminate in a Convergent/Divergent (C/D) nozzle system, a non-axisymmetric two-dimensional (2D) C/D vectorable nozzle system, a flattened slot nozzle of high aspect ratio or other nozzle arrangement.

Referring to FIGS. 2 and 3, a turbomachine component 200 (e.g., a blade, vane, or any other suitable component) is defined at least partially in a radial direction and an axial direction orthogonal to the radial direction and includes a body 201 defining an outer surface 203 configured to be in thermal communication with a gas path flow in the axial direction. The body 201 can include an airfoil shape or any other suitable shape.

The component 200 includes a thermal regulation channel system 204 defined within the body 201 which includes at least one radial channel 205 configured to allow thermal regulation flow in the radial direction, and at least one axial channel 207 configured to allow thermal regulation flow in the axial direction. The body 201 is configured to be positioned in fluid communication to a thermal regulating flow source (e.g., cooling flow from a turbomachine compressor).

As shown, the component 200 can have a plurality of tube-like axial channels 207 that connect a plurality (e.g., two) of radial channels 205. The radial channels 205 can be fluidly isolated along their entire length, or isolated only proximate the axial channels 207. Any other suitable fluid connection and/or isolation of radial channels 205 is contemplated herein. In certain embodiments, the radial channels 205 can include a larger flow area than the axial channels 207 such that the flow velocity through the axial channels 207 is higher the radial channels 205.

In certain embodiments, the plurality of axial channels 207 can include at least one pair of axial channels 207 that are radially and/or axially aligned on opposite circumferential sides of the two radial channels 205 as shown in FIGS. 2 and 3. It is contemplated that a single axial channel 207 can be utilized at a particular radial position of the body 201 (e.g., to cool only one side of the body 201).

At least one film hole 209 can be defined through a wall of the body 201 and into the thermal regulation channel system 204 to induce axial flow in the at least one axial flow channel 207. For example, the flow from the thermal regulation channel system 204 can effuse into the gas path flow through the at least one film hole 209. Each film hole 209 can define a channel system opening 209a positioned axially and/or radially aligned with one or more respective axial channels 207 to induce an axial flow through the axial channel 207.

In certain embodiments, as shown, there can be at least one film hole 209 per pair of axial channels 207 to induce an axial flow through the axial channels 207. In certain embodiments, the component 200 can include at least one film hole 209 per axial channel 207.

As shown, each film hole 209 can be angled in a direction of gas path flow from the channel system opening 209a to a gas path opening 209b. The channel system opening 209a can be offset from the axial channels 207 so as to draw air through each axial channel 207 and into the radial channel 205 an area proximate the channel system opening 209a.

As shown, the film holes 209 are positioned to be in fluid communication with the aft radial channel 205 so as to pull air from the forward radial channel 205 through the axial channels 207 to create an axial flow. Any suitable positioning (either forward or aft of the radial channels 205) of one or more film holes 209 is contemplated herein, as long as an axial flow in the axial channels 207 is generated.

In accordance with at least one aspect of this disclosure, a method for forming a turbomachine component 200 can include forming an body 201 to include a thermal regulation channel system 204 as described above. Forming the body 201 includes forming at least one radial channel 205 configured to allow thermal regulation flow in a radial direction and forming at least one axial channel 207 configured to allow thermal regulation flow in an axial direction orthogonal to the radial direction. Forming the at least one radial channel 205 can include forming two radial channels 205, wherein forming the at least one axial channel 207 includes forming a pair of axially and/or radially aligned channels 207 on opposite sides of the two radial channels 205 such that the pair of aligned channels 207 connect the two radial channels 205.

While the above embodiments are shown as airfoils, it is contemplated that any other suitable turbomachine component including internal cooling passages can be made having a thermal regulation channel system 204 as described above.

The above described configuration allows thermal regulation flow (e.g., cooling flow) to be effused at an aerodynamically favorable location compared to the traditional methods. For example, the flow can be used to cool one side of the configuration and yet be effused on the opposite side of the component. Also, the coolant can pick up heat in the axial direction rather than the radial direction as in traditional systems, which enables enhanced tailoring and improved efficiency of the thermal regulation of the component.

The methods and systems of the present disclosure, as described above and shown in the drawings, provide for turbomachine components with superior properties including improved thermal regulation. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A turbomachine component defined at least partially in a radial direction and an axial direction orthogonal to the radial direction, comprising:
a body defining an outer surface configured to be in thermal communication with a gas path flow in the axial direction; and
a thermal regulation channel system defined within the body, comprising:
two radial channels configured to allow thermal regulation flow in the radial direction; and
at least one pair of axial channels that are at least one of radially and axially aligned on opposite circumferential sides of the two radial channels and which connect the two radial channels and are configured to allow thermal regulation flow in the axial direction.

2. The component of claim 1, wherein the body includes an airfoil shape.

3. The component of claim 1, further comprising at least one film hole defined through a wall of the body and into the thermal regulation channel system to induce axial flow in the at least one pair of axial flow channels, wherein the flow from the thermal regulation channel system can effuse into the gas path flow.

4. The component of claim 1, wherein the two radial channels include a larger flow area than the at least one axial channel.

5. The component of claim 3, wherein the at least one pair of axial channels comprises a plurality of axial channels connecting the two radial channels.

6. The component of claim 5, wherein the at least one film hole includes at least one film hole per axial channel, wherein each film hole defines a channel system opening positioned axially and/or radially aligned with one or more respective axial channels to induce an axial flow through the axial channel.

7. The component of claim 5, wherein the at least one film hole includes at least one film hole per pair of axial channels, wherein each film hole defines a channel system opening positioned axially and/or radially aligned with a respective pair of axial channels to induce an axial flow through the axial channels.

8. The component of claim 7, wherein each film hole is angled in a direction of gas path flow from the channel system opening to a gas path opening.

9. A vane defined at least partially in a radial direction and an axial direction orthogonal, comprising:
a airfoil body defining an outer surface configured to be in thermal communication with a gas path flow in the axial direction; and
a thermal regulation channel system defined within the airfoil body, comprising:
two radial channels configured to allow thermal regulation flow in the radial direction;
at least one axial channel that connects the two radial channels and configured to allow thermal regulation flow in the axial direction; and
at least one film hole extending through a wall of the airfoil body and extending between a channel system opening disposed adjacent to the at least one axial channel and a gas path opening disposed adjacent to one of the two radial channels to draw air through the at least one axial channel and into one of the two radial channels.

10. The vane of claim 9, wherein the two radial channels include a larger flow area than the at least one axial channel.

11. The vane of claim 9, wherein the at least one axial channel comprises a plurality of axial channels connecting the two radial channels.

12. The vane of claim 11, wherein the at least one film hole includes at least one film hole per axial channel, wherein each film hole defines a channel system opening positioned axially and/or radially aligned with one or more respective axial channels to induce an axial flow through the axial channel.

13. The vane of claim 11, wherein the plurality of axial channels include at least one pair of axial channels that are radially and/or axially aligned on opposite circumferential sides of the two radial channels.

14. The vane of claim 13, wherein the at least one film hole includes at least one film hole per pair of axial channels, wherein each film hole defines a channel system opening positioned axially and/or radially aligned with a respective pair of axial channels to induce an axial flow through the axial channels.

15. The vane of claim 14, wherein each film hole is angled in a direction of gas path flow from the channel system opening to a gas path opening.

16. A component, comprising:
a body defining an outer surface configured to be in thermal communication with a gas path flow in an axial direction; and
a thermal regulation channel system defined within the body, comprising:
two radial channels configured to allow thermal regulation flow in a radial direction that is orthogonal to the axial direction;
at least one pair of axial channels that connect the two radial channels and are aligned on opposite sides of the two radial channels and configured to allow thermal regulation flow in the axial direction; and
at least one film hole extending through a wall of the body and extending between an axial channel of the at least one pair of axial channels and one channel of the two radial channels.

* * * * *